United States Patent [19]

Lee

[11] 4,261,014
[45] Apr. 7, 1981

[54] SPOT ARREST SYSTEM

[75] Inventor: Ronald B. Lee, Skokie, Ill.

[73] Assignee: Zenith Radio Corporation, Glenview, Ill.

[21] Appl. No.: 99,372

[22] Filed: Dec. 3, 1979

[51] Int. Cl.³ .............................................. H04N 5/14
[52] U.S. Cl. .................................... 358/166; 358/160; 358/162; 358/242
[58] Field of Search ................ 358/160, 162, 166, 242

[56] References Cited

U.S. PATENT DOCUMENTS

| | | | |
|---|---|---|---|
| 2,678,964 | 5/1954 | Loughlin | 358/166 |
| 3,681,618 | 8/1972 | Blackmer | 358/145 |
| 3,752,916 | 8/1973 | Lowry | 358/160 |
| 3,995,108 | 11/1976 | Morrison | 358/162 |
| 4,080,628 | 3/1978 | Jirka | 358/166 |

Primary Examiner—Howard W. Britton
Attorney, Agent, or Firm—John H. Coult

[57] ABSTRACT

A spot arrest system modulates cathode ray tube beam scanning speed in accordance with compressed and noise-processed image enhancement signals derived from video signal transitions. A generator provides first derivative type image enhancement signals which are compressed by a log amplifier. The log amplifier tends to equalize the amplitude of the image enhancement signals for various video transitions at an optimum amplitude. The signals are then applied to a noise processor which attenuates image enhancement signals which do not correlate to first derivatives of the corresponding video signals. In the noise processor, a multiplier receives as one input the compressed image enhancement signals and receives as another input control signals based on first derivatives of the video signals. The noise-processed signals are then coupled to the cathode ray tube to modulate the beam scan speed. Additionally, beam current may be modulated inversely with respect to the beam scan speed modulation.

25 Claims, 12 Drawing Figures

SPOT ARREST SYSTEM

BACKGROUND OF THE INVENTION

This invention relates generally to scanned display systems such as those utilizing a cathode ray tube display device. It relates especially to television receivers which employ velocity modulation of a cathode ray tube's electron beam for image enhancement.

Typically, scan display systems of the type to which the present invention pertains comprise a viewing screen which is scanned by a modulated electron beam to develop an image. The intensity of the displayed image is instantaneously controlled by an intensity control signal. When an abrupt change in brightness level is sought to be reproduced, a problem arises due to the finite time interval required for the intensity control system to effect a change of image brightness level. Because scan continues during this interval, the brightness change in the transition area is gradual, rather than abrupt, producing a blurred edge on the depicted image.

In a cathode ray tube (CRT), for example of the type used as the display device in television receivers, electronic games and computer readout terminals, one or more electron beams are directed toward a phosphor viewing screen which emits light when bombarded by high-energy electrons. The electron beam or beams are caused to scan in both horizontal and vertical directions by an electromagnetic deflection yoke positioned on the CRT adjacent the electron beam path. Control electrodes within the CRT regulate the CRT beam current which, in turn, control image brightness. The limited bandwidth of the system gives rise to the above-described edge blurring when an abrupt or instantaneous change in brightness level is sought.

Television designers have tried various approaches to improve edge sharpness in video display, such as velocity modulation systems which temporarily arrest or slow horizontal scan during abrupt changes of the intensity signal (referred to herein also as "spot arrest systems"). For example, U.S. Pat. No. 2,678,964 shows a system in which the horizontal scan is velocity modulated with "image enhancement signals" produced by taking various derivatives of the image intensity signal. The basic idea is to stop or slow the scan movement of the electron beam during the brightness transition period to allow time for the intensity control circuitry to change the brightness level at an image transition.

Historically, spot arrest systems have derived image enhancement signals from derivatives of the video signal because of the simplicity of implementation and the guaranteed correlation of the enhancement signal to transitions (as opposed to generating a fixed image enhancement signal for every transition). Such a system produces image enhancement signals which are proportional to the derivatives of the video signal and therefore proportional to the magnitude of the video transitions. Generally, image enhancement of a video picture is perceptible only when there is substantial beam retardation, roughly 75% or more from the nominal scan speed. Further, most transitions in typical commercial broadcast television are 50% or less than the maximum black to white transition. As a result, except during high level transitions, the degree of image enhancement (beam retardation or acceleration) in such typical prior art spot arrest systems using essentially first derivative image enhancement signals is usually imperceptible.

The problem was recognized and addressed by Lowry, U.S. Pat. No. 3,752,916. Lowry modified the image enhancement signal by a non-linear amplifier so that at a transition point of over approximately 10%, the image enhancement signal amplitude tended toward an optimum amplitude. At about the 10% transition level, the image enhancement signal amplitude was about 50% of the optimum amplitude. The enhancement fell off rapidly below 10%. While this falling off toward zero is advantageous, systems using this approach nevertheless produced an intolerable amount of noise which was manifested as intensity variations in the video display due to a velocity stuttered scan.

An investigatory approach by others at Zenith involved automatic gain adjustment of an image enhancement signal. A control signal was used to change the gain of an amplifier to generate a substantially constant amplitude enhancement signal. The control signal was based on the video signal and comprised a rectified first derivative signal which was then shaped to remove ripples in the top of the pulse. If the control signal was small in amplitude, the gain of the controlled amplifier was increased. Conversely, if the control signal amplitude was small, the amplifier gain was reduced. While this system did improve enhancement of some video transitions, it significantly increased noise.

One approach to removing noise in a particular part of a television system is disclosed in Morrison, U.S. Pat. No. 3,995,108. Morrison does not address spot arrest systems, but deals with aperture correction wherein luminance transitions are sharpened by increasing the amplitude of higher frequency components with respect to low frequency components. In such systems noise is amplified also. Morrison describes a system for removing such noise from aperture correction signals by using a gated coring system which passes or rejects signals on the basis of a control signal which corresponds to noise signals.

In addition to these problems of low transition level enhancement and excessive noise in spot arrest systems, a further problem is a change in edge contrast, that is, excessive brightness changes at the video transitions. There have been recent investigative efforts by others also at Zenith to compensate for brightness changes through a correction signal applied to the displayed luminance signal. In one such experimental effort, a control signal was multiplied with the luminance signal so that when brightness was in a decreasing state, the electron beam current was in an increasing state, and vice-versa. While a spot arrest system with such brightness compensation was satisfactory from the point of view of edge contrast, it was not able to enhance images satisfactorily over a sufficiently wide range of video transition levels.

Another problem with prior spot arrest systems is geometric distortion of the displayed images. For example, white objects may appear narrower, and black objects wider, than intended. Still further problems are, first, the undesirable effect of an artificial looking display and, second, the high cost of the systems.

Accordingly, it is a general object of the present invention to provide an improved method and apparatus for enhancing the sharpness of television images.

Another object is to provide a spot arresting system which does not suffer from excessive noise.

A further object is to provide such a system which provides visually perceptible edge enhancement over a wide range of video transition levels.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings in which:

DESCRIPTION OF THE PREFERRED EMBODIMENT

The following brief explanation of (1) how modulating the scan velocity of a CRT electron beam enhances the crispness of the television image, and (2) how the prior art generated the control signal for this beam modulation, will be helpful in describing the present invention.

Figures 1, 3A:
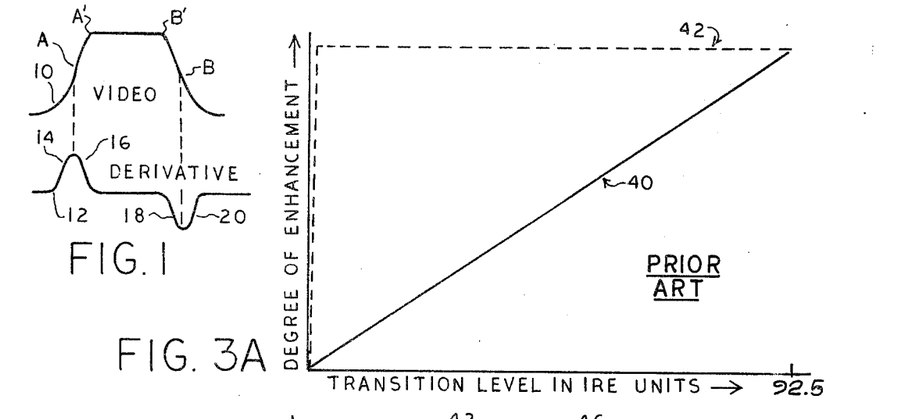
FIG. 1 schematically illustrates a waveform which is useful in describing the present invention.
FIG. 3A is a sketch of the degree of enhancement for a prior art image enhancement signal and FIG. 3B is a similar sketch showing the degree of enhancement for the illustrated embodiment of the present invention.

FIG. 1 shows an exemplary video waveform 10 which, it will be assumed, is used to intensity modulate a CRT electron beam. As shown, video waveform 10 begins at a black level, rises quickly in a generally sinusoidal manner to a white level at which it remains for an interval, and then quickly returns to the black level. It has a finite rise time and fall time, due in part to the bandwidth of the television system. Because of the finite and sometimes undesirably slow rise time of such a video waveform, the image which it generates on the CRT is less sharp than is desired. Many receivers include peaking circuitry for generating preshoot and overshoot peaking components for addition to the video signal in order to effect a more crisp and pleasing television image.

In spot arrest systems, the television image is crispened by modulating the scan velocity of the CRT electron beam with an image enhancement signal which corresponds to the first derivative of the video signal which is simultaneously intensity modulating the CRT electron beam. The first derivative of video signal 10 is a waveform 12 in FIG. 1. Derivative waveform 12 should have a time correspondence to the video signal as indicated in FIG. 1; that is, the peaks of the derivative waveform should occur near the central portions, A and B, of the rise and fall times of the video signal.

When derivative waveform 12 is applied to an electron beam scan velocity device, the scan velocity of the electron beam will be modified in accordance with the slope thereof. Thus, when leading edge 14 of waveform 12 reaches the scan velocity device, a field will be set up within the CRT which causes the electron beam scan to be accelerated beyond its normal scan rate so that the beam moves ahead beyond a midpoint A of video waveform 10 to the top A' thereof. Trailing edge 16 of waveform 12 then causes the electron beam to decelerate below its normal scan rate so that the electron beam spot is maintained for a somewhat longer time at a position on the CRT which corresponds to the point A'. The effect of accelerating the electron beam scan rate and its subsequent deceleration is to cause that area of the CRT which immediately preceeds the sharp video transition to be somewhat darker than normal since the electron beam spends less time there.

When video waveform 10 is falling from a white level to a black level, the derivative waveform 12 goes negative. Edge 18 of waveform 12 causes the scan velocity of the electron beam to decrease so that the beam lingers at a point on the viewing screen corresponding to point B' of video waveform 10. Edge 20 of waveform 12 then causes the scan velocity of the electron beam to increase to make up for the time lost by the action of edge 18.

In the case of a video signal such as 10 in FIG. 1, which may correspond to a white stripe on a black field, the effect of the above-described modulation of the electron beam scan rate will be to narrow the white stripe and cause it to more nearly correspond to an image which a signal having a much faster rise time should produce.

Figure 2:
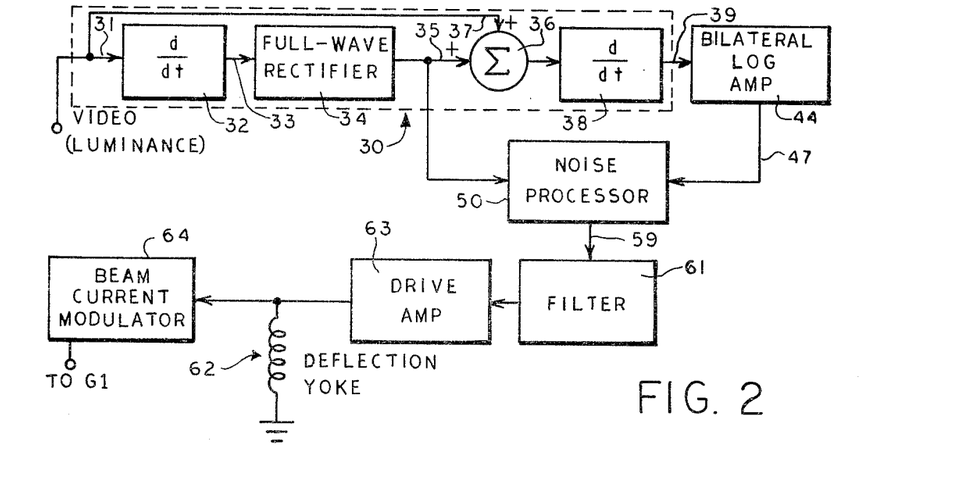
FIG. 2 is a block diagram of a spot arrest system according to the present invention.

FIG. 2 illustrates a preferred embodiment of a spot arrest system according to the present invention. The system there illustrated achieves the following functions: (1) generation of an image enhancement signal, (2) alteration of that enhancement signal for improved performance, (3) noise reduction, (4) electron beam deflection, and (5) beam current modulation to compensate for the scan velocity modulation.

As used herein, the term "image enhancement signal" means a signal for use in a scan velocity modulation system which has first a positive slope and then a negative slope in time correlation with a black-white transition in the video signal. Typically, a first derivative of the video signal as described above is employed, at least as a starting point, since it has this basic characteristic. It should be understood, however, that a signal meeting this requirement need not be a first derivative, but contemplates any signal which, as used to modulate the scan velocity, causes the beam, at a black-to-white transition, to advance at a greater than normal rate and then stop or retard before resuming the normal scan rate.

Referring to FIG. 2, the image enhancement signal generator 30 shown therein provides a "rectified first derivative" type signal described by the following equation:

$$\text{Output} = af' + b|f'|'$$

where f is the luminance input and a and b are constants. Image enhancement signal generator 30 comprises differentiator 32, full-wave rectifier 34, summer 36 and differentiator 38. An input 31 of differentiator 32 is coupled to the IF detector of the television receiver in which the spot arrest system is furnished. The image enhancement signal is based on luminance information only, so means (not shown) for removing chroma components, by filtering for example, are used in coupling the IF detector to input 31. Differentiator 32 outputs a first derivative signal (Af') of the video signal (f), such as that shown at 12 through 20 of FIG. 1, on a lead 33. The video derivatives is then full-wave rectified, for purposes mentioned infra, by rectifier 34 which provides unipolar signals of the form $A|f'|$ on its output lead 35. Lead 35 provides one input to summer 36, which receives at its second input 37 the luminance signal applied to input 31. Summer 36 applies a signal $f+A|f'|$ to the input of differentiator 38 whose output 39 of the form $af'+b|f'|'$ is an image enhancement signal.

Figure 3B:
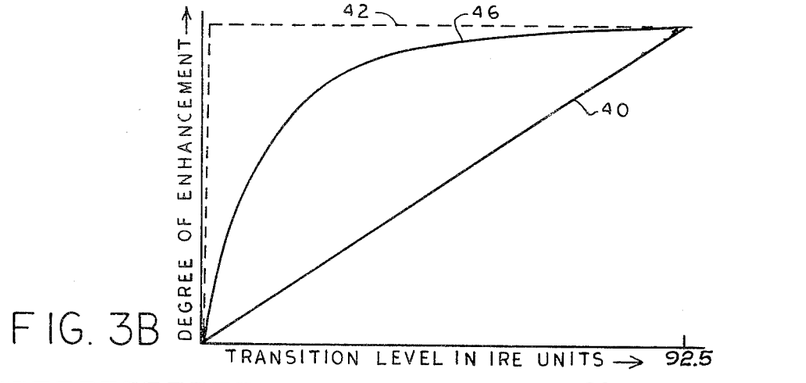

This image enhancement signal is then "compressed," that is, operated upon so that the amplitude of image enhancement signals for differing video transitions tend toward a certain value. FIGS. 3A and 3B show the effect of one illustrative type of compression, logarithmic, on the image enhancement signal, and it will be understood that other kinds of compression such as square or cube rooting, may be employed. FIGS. 3A and 3B show the degrees of enhancement, which can be regarded physically as the magnitude of beam scanning speed alteration, plotted against the amplitude of the corresponding video signal transition. The abscissa of each of FIGS. 3A and 3B is denominated in IRE levels, or units, with a transition of 92.5 units being the maximum transition from black (7.5) to white (100). In FIG. 3A it can be seen that prior art image enhancement signals 40, which essentially consist of simple first derivatives of the video signal, are linear and that small degrees of enhancement correspond to small transitions. An ideal image enhancement curve 42 is shown intersecting the prior art curve 40 at the 92.5 IRE unit transition level. This corresponds to an optimal beam retardation (which may be a complete stoppage) at the maximum transition. Ideally, all non-zero transitions should have a degree of image enhancement approaching or at the ideal curve 42. At and about the zero level, transitions are essentially noise and should not be enhanced.

FIG. 3B illustrates the degree of image enhancement 46 after the signal on output lead 39 is operated on by a bilateral logarithmic amplifier 44 (FIG. 2).

Figure 4:
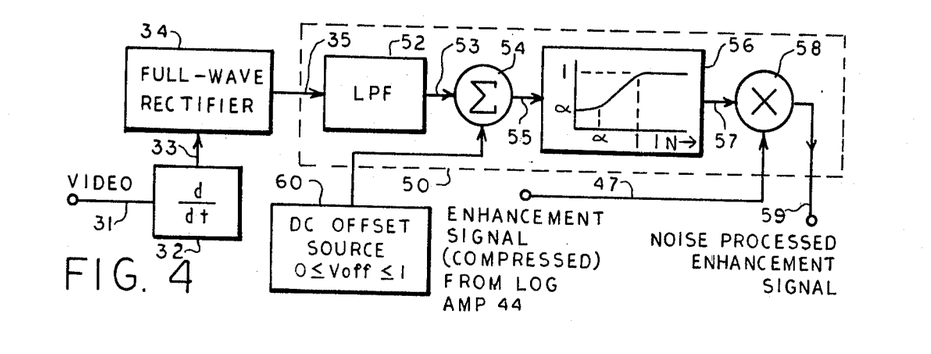
FIG. 4 is a block diagram showing a noise processor of FIG. 2 according to the present invention.

In order to compensate for enhanced noise, a noise processor 50 determines if a transition really exists by testing the correlation of the compressed image enhancement signal from the output lead 47 of amplifier 44, with a first derivative of the video signal. A block diagram of noise processor 50 is shown in FIG. 4 and includes a low pass filter 52, a summer 54, a voltage limiter 56, a multiplier 58 and a voltage source 60. The noise processor 50 receives one input corresponding to the first derivative of the video signal which is ultimately applied to one input of multiplier 58. The second input to noise processor 50 and multiplier 58 is the compressed image enhancement signal on lead 47. So that the polarity of the output of multiplier 58 is the same as the polarity of the image enhancement signal on lead 47, a full-wave rectifier 34 operates on the first derivative input. In any modifications where this polarity problem is otherwise overcome, rectifier 34 may be omitted. The rectified signal on lead 35 is applied to low pass filter 52 which attenuates cusps created by rectifier 34 and which also removes some noise. The filtered video derivative signal is applied to one input 53 of adder 54. An offset voltage of between zero and one volt DC is provided by voltage source 60 to a second input of adder 54. The resulting voltage-offset, filtered, rectified, first derivative video signal is then applied by a lead 55 to limiter 56 which limits signals inputted thereto to a voltage of, illustratively, between alpha ($\alpha$) and one volt, depending on the inputted voltage. Thus, if the amplitude of the signal on lead 55 exceeds an upper threshold, a control signal outputted by limiter 56 on its output lead 57 will be one volt, illustratively. If the input voltage is below a lower threshold, the control signal will be limited to alpha ($\alpha$). If the offset voltage $V_{off}$ contribution from source 60 to the input signal on lead 55 exceeds alpha ($\alpha$), then the control signal on output 57 will be at least $V_{off}$. If the amplitude of the input signal to limiter 56 is between the upper and lower thresholds, the control signal will be limited to a voltage between alpha ($\alpha$) and one volt. Lead 57 couples the control signal generated by limiter 56 to one input of multiplier 58 whose other input, it will be recalled, is the compressed image enhancement signal on output lead 47 from log amplifier 44.

In operation, when a genuine video transition occurs, i.e. one which is probably not noise, the control signal on lead 57 is at a maximum and permits multiplier 58 to output the image enhancement signal on its output lead 59 undiminished. If, however, mere noise develops on the video signal and causes the spot arrest circuitry to generate an image enhancement signal, the control signal on lead 57 will be small and the signal on lead 59 will be diminished. This tends to reduce or turn off spot arrest in broad, flat areas of the video signal and turn on spot arrest during transitions, therefore reducing the noise contribution to the overall picture while still operating on edges.

Referring again to FIG. 2, the noise processed compressed image enhancement signal is applied to a filter 61 which operates to compensate for distortions in the shape of the image enhancement signal caused by log amplifier 44.

For electron beam deflection, whether done electrostatically or magnetically, coupling must be made to the CRT. In the electrostatic case, the CRT is manufactured with deflection plates therein. In the magnetic case, the CRT can be left unaltered, and coupling can be made through an external yoke. Although the system described thus far may be used with either type of deflection, the magnetic approach has certain advantages. First, it requires no alteration of the CRT and could therefore be adapted to any CRT. Second, drive circuitry for magnetic deflection is simpler and more efficient than electrostatic deflection plate circuitry, so that the drive circuits could be driven at lower quiescent currents and lower operating voltages while producing the same results. Third, the overall cost of magnetic deflection is significantly lower. Fourth, magnetic deflection lends itself to simple beam current modulation as shall be shown later. Thus, the system illustrated in FIG. 2 uses the magnetic approach and includes a deflection yoke 62 driven by a drive amplifier 63 which amplifies the output of filter 61.

As the rate of scan of the electron beam is modulated by the spot arrest circuitry, the intensity of the display varies. When the beam speeds up, the intensity of generated images drops, and as the beam slows, the intensity increases. Although this effect is desirable in that it simulates preshoots and overshoots, it is the source of the artificiality of pictures. Large transitions are especially subject to artificial appearance.

To alleviate this problem, the system shown in FIG. 2 includes a beam current modulator 64. It counteracts the effects of scan modulation on intensity by reducing beam current when the scan modulation slows or stops the beam and by increasing beam current when the scan modulation speeds up the beam. This counteraction is done in accordance with the derivative of the enhancement signal which is the voltage available on deflection yoke 62, and no additional circuitry is required for generation of the modulating signal. Furthermore, modulation is achieved by coupling the yoke voltage directly to one of the CRT grids through a capacitor. The voltage coupled to the grid may be "cored" to prevent beam current modulation at low transition levels which preserves the preshoot/overshoot effect on low level transitions, with reduced artificiality on high level transitions. Another advantage of modulating the beam current in this manner is that timing is automatically correct. Hence, while this is not the only way to modulate the beam current, it is a simple, inexpensive and effective combination.

FIGS. 5 through 8 illustrate circuits practicing the present invention.

Figure 5:
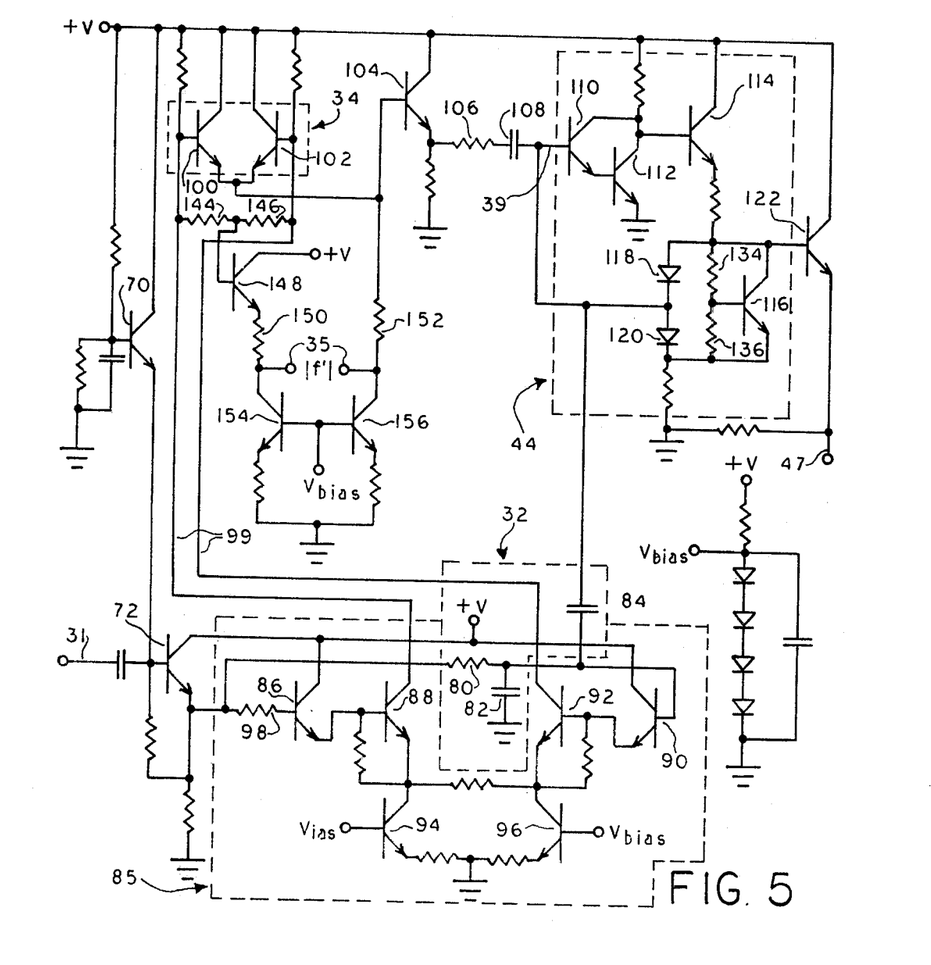
FIG. 5 schematically shows a rectified first derivative image enhancement signal generator and a bilateral logarithmic amplifier used in the illustrated embodiment of the present invention.

FIG. 5 schematically diagrams a "rectified first derivative" image enhancement signal generator and a bilateral logarithmic amplifier 44. The luminance input 31 into the image enhancement signal generator must be free of chroma and should be equalized for linear phase and minimum preshoot and overshoot to avoid enhancement of unwanted signals. The luminance signal is inputted to transistors 70 and 72 at a level of about three volts sync tip to white where it is buffered and clamped. (The clamping is not necessary since only AC signals are of interest). A first derivative of this signal is then taken by differentiator 32 which comprises a filter consisting of resistor 80 and the combined capacitance of capacitors 82 and 84. Beside providing a first derivative signal differentially across the resistor 80, the filtering serves two further purposes: first, to help further equalize the video signal by reducing residual preshoot caused by the IF stage; and second, to filter out some of the high frequency components to reduce noise. This differential signal is then amplified by a differential amplifier 85 consisting of transistors 86 through 96 to a level of two volts peak-to-peak at each collector of transistors 88 and 92. This level is important because it determines the noise processing thresholds. Resistor 98 at the base of transistor 86 matches the impedance thereof to the impedance at the base of transistor 90, thereby to maintain DC balance in differential amplifier 85.

Leads 99 carry the output of the differential amplifier which is then full-wave rectified at the emitters of transistors 100 and 102 and buffered by transistor 104 to drive a resistor 106 and a capacitor 108. Resistor 106 stops oscillations and capacitor 108 creates a current proportional to the derivative of the rectified first derivative at the base of transistor 110, i.e. input 39 of log amp 44. This works because the log amp input is in incremental (or AC) ground. This current can be written as:

$$I = b|f'|'$$

where f is the luminance input and b is a constant determined by the capacitor 108. This current is summed at the base of transistor 110 with the current through capacitor 84 which is also a differentiating capacitor whose current is:

$$I = af'$$

where f is the luminance input and a is a constant determined by the capacitor 84. Therefore, the total current into the log amplifier is of the form:

$$I = af' + b|f'|'$$

which is the form for "rectified first derivative" enhancement signal generation.

The logarithmic amplifier 44 comprises transistors 110, 112, 114 and 116 and diodes 118 and 120. This circuit takes the bilateral log (i.e. the log of a positive or negative value) of the summed currents and outputs a voltage to a transistor 122 which serves as a buffer. Log amplifier 44 is a feedback amplifier with diodes 118 and 120 in the feedback path. Note that the bias current for transistor 110 must flow through diodes 118 and 120 and must therefore be kept small for symmetrical operation. The input currents must also be AC coupled to avoid offset currents.

Figure 6:
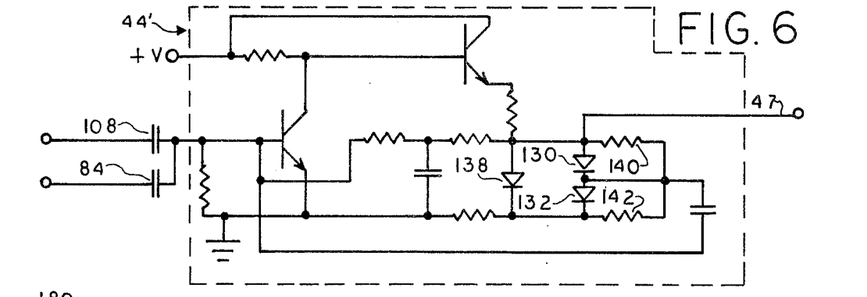
FIG. 6 schematically illustrates an alternative embodiment of a logarithmic amplifier which may be used in the present invention.

An alternative log amplifier 44' is shown in FIG. 6 and receives the same inputs from capacitors 84 and 108 as the log amplifier 44 of FIG. 5. It is also a feedback amplifier with diodes 130 and 132 in the feedback path but there is a separate feedback path for DC. This avoids bias current through the feedback diodes and offers better performance. The separate DC feedback also obviates a darlington input stage.

In the log amplifiers 44 or 44' the diodes 118 and 120, or 130 and 132, respectively; need to be matched for symmetric operation and should actually be the base-emitter junctions of high beta transistors with base and collector tied together. NPN integrated transistors yield good results.

In log amplifiers 44 and 44', diodes 118 and 120, or 130 and 132, are forward biased slightly to achieve the frequency response needed for video operation. In order to do this, a fixed voltage is applied across the diodes at all times. This is done by means of transistor 116 and resistors 134 and 136 in FIG. 5, and by means of a diode 138 in FIG. 6. Since the bias in FIG. 6 is about one-half diode drop less than that in FIG. 5 and the impedance of the matched diodes therefore much greater, resistors 140 and 142 are added in parallel to diodes 130 and 132 to limit the impedance seen at the junction therebetween. This helps increase the speed of the circuit at low current levels. While the bias improves frequency response, it also reduces the usable dynamic range. Although only a 40 dB dynamic range is required, care must be taken to insure sufficient dynamic range for satisfactory compression. More bias will also reduce the output amplitude and thereby require more amplification later. The circuits in FIGS. 5 and 6 have peak-to-peak outputs of two diode drops minus the bias voltage used. Further understanding of this kind of circuit is available by referring to David Blackmer, "RMS Circuit with Bipolar Logarithmic Converter," U.S. Pat. No. 3,681,618.

FIG. 5 also provides the rectified first derivative signal used by the noise processor 50. A DC reference for the rectified first derivative signal is derived by means of two matched resistors 144 and 146 across the output 99 of the differential amplifier 85, and transistor 148 is used to match the base emitter drops of transistors 100 and 102. The two signals are then level-shifted by matched resistors 150 and 152 operating under constant currents provided by transistors 154 and 156. The level-shifting drives the noise processor at a reasonable bias point.

Figure 7:
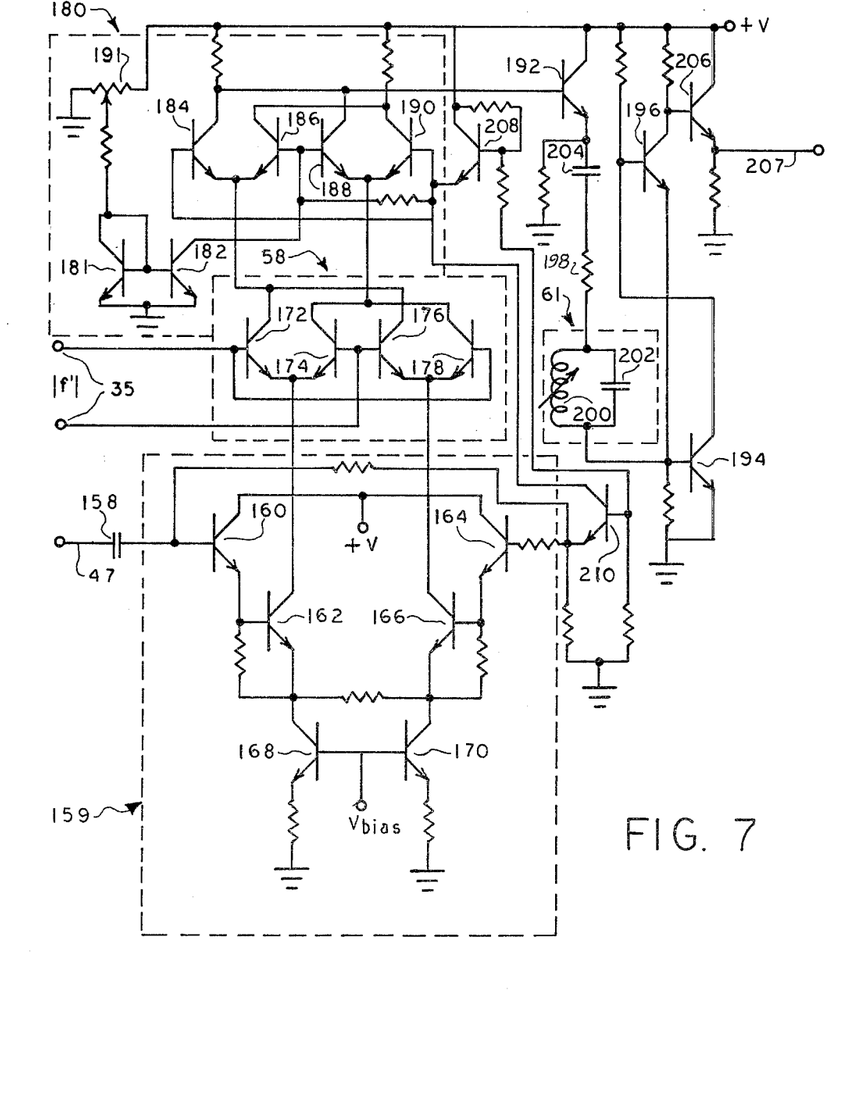
FIG. 7 schematically illustrates exemplary amplifier, noise processor, filter and gain control circuits used with the circuit of FIG. 5.

FIG. 7 shows a schematic of the noise processor and filter, and further includes gain control circuits and an amplifier. The output 47 of the log amplifier 44 is AC coupled through a capacitor 158 into a differential amplifier 159 comprising transistors 160 through 170. Differential amplifier 159 converts the single-ended output of the log amp 44 into a differential current to drive a noise processing multiplier 58 formed by transistors 172, 174, 176 and 178. The illustrated noise processor is a gated noise coring system which correlates the operation of the gate to the video signal. The coring system strips out low level noise without affecting large amplitude signals. In the illustrative embodiment of FIG. 7, the level-shifted rectified first derivative and its DC reference, the |f′| signal imputted on leads 35, are the control signal which is limited inherently by the differential amplifier characteristic of the overdriven multiplier 58. Thus, no separate limiter 56 is shown. Further, no filter 52 for the rectified first derivative is shown because the stray capacitance is sufficient filtering in this particular case. Also, no offset voltage is used in this configuration. If offsets and filtering are desired, they can be done at the level shifter by level shifting the reference voltage a little more for offsets and by putting a capacitor to ground on the level shifted rectified first derivative for filtering.

A spot arrest gain control circuit 180 in FIG. 7 comprises transistors 181 and 182 which form a current mirror. This determines an offset voltage for cross-coupled differential transistors 184, 186, 188 and 190, depending on the polarity desired. The gain is adjustable by potentiometer 191.

Transistor 192 is used as a buffer to drive the inverting feedback amplifier made up of transistors 194 and 196. The input of the inverting feedback amplifier is a current into the base of transistor 194 which is controlled by a resistor 198 and a filter 61 made up of a coil 200 and a capacitor 202. This coil 200 and capacitor 202 form a notched response filter which is used to shape the logged and noise-processed enhancement signal. A capacitor 204 in series with resistor 198 is for AC coupling, and transistor 206 then serves to buffer the signal outputted on a lead 207 to drive amplifier 63. The signal level at this point is four to five volts peak-to-peak. Transistors 208 and 210 provide voltage references for gain control circuit 180 and differential amplifier 159.

Figure 8:
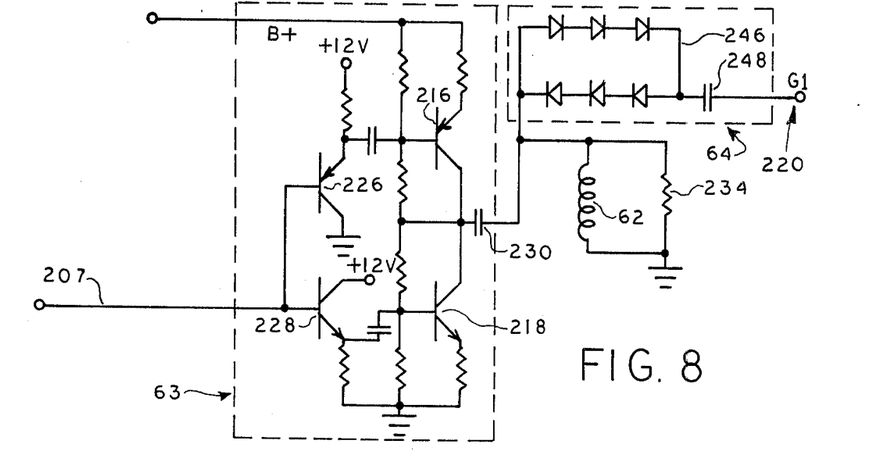
FIG. 8 schematically illustrates a drive amplifier for magnetic deflection and a beam current modulator for a cathode ray tube with which the present invention may be used.

FIG. 8 schematically illustrates a drive amplifier 63 for magnetic deflection and a beam current modulator 64. Transistors 226 and 228 are buffers which are only required to operate alternately on negative and positive going inputs respectively. Diagonal clipping may permissibly occur during the polarity input which is not of interest. Transistor 226 buffers transistor 216, and transistor 228 buffers transistor 218. Transistors 216 and 218 form a class AB amplifier with a current output to drive AC current through a capacitor 230 into the deflection yoke 62 which is damped by a parallel resistor 234.

Figure 9A:
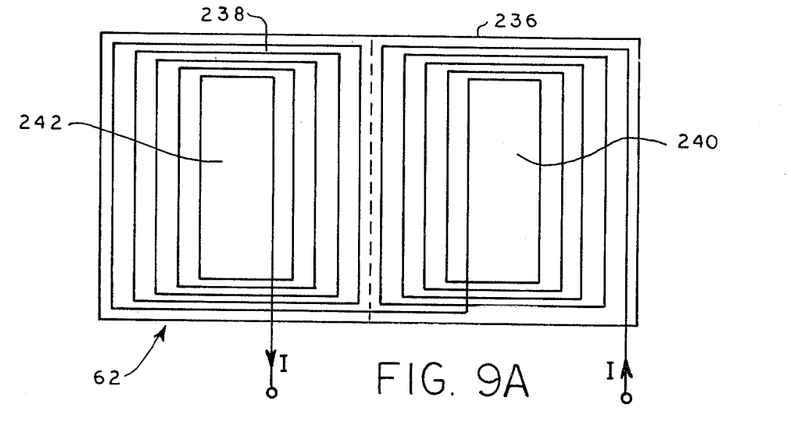
FIGS. 9A, 9B and 9C schematically show an illustrative magnetic deflection coil for use in the present invention.
Figure 9B:
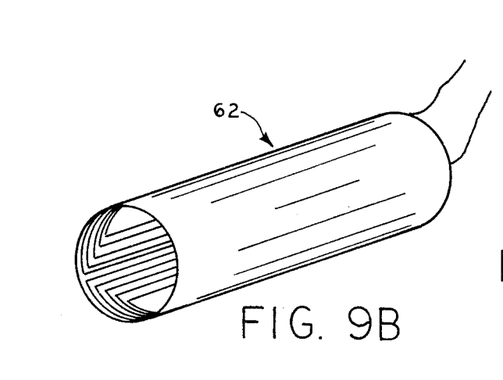
Figure 9C:
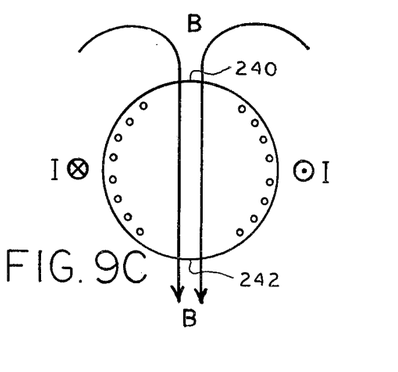

Deflection yoke 62 is a flat pancake coil of between about six and thirty turns (depending on application) with inductance ranging from 1 μH to 50 μH. It is thin enough to be slipped on the CRT neck under the regular deflection yoke. FIG. 9 illustrates a deflection yoke 62 which may be built with magnet wire placed on tape to form two coils 236 and 238 of equal turns driven in series. Advantageously, the coils should be wound so that the wires are distributed evenly along the circumference of the CRT neck except for two windows 240 and 242 at the top and bottom, respectively, with the yoke wound so that the wire on either side of the neck spans 135° of arc.

Beam current modulation is accomplished in this illustrative embodiment by AC coupling the deflection yoke 62 voltage to a grid G1 (not illustrated) of an associated CRT via diodes 246 and coupling capacitor 248 (FIG. 8). Diodes 246 core the yoke voltage and prevent beam current modulation during low level transitions. This helps to maintain a sharp looking picture while taking away some of the obvious artifacts of spot arrest. The number of diodes is determined by a compromise between sharp looking pictures and artifacts. Alternatively, back-to-back zener diodes can be used.

In order to drive grid G1 with any substantial voltage, the yoke voltage must be made high, which dictates a high driving current or high yoke inductance. Those skilled in the art will take care to ensure that the yoke polarity counteracts, rather than enhances, the effect of the scan modulation.

The foregoing illustrative embodiment of a spot arrest system addresses many past problems with spot arrest and provides better performance at reasonably low cost. Performance is improved by the reduction of geometric distortions, artificiality and noise and by the increase of visible dynamic range. Magnetic deflection has cost advantages in both CRT and the drive amplifier.

The present invention can be used in combination with a variety of prior art systems which develop an image enhancement signal, as shown, for example, in H. F. Jirka, "Expanded-Signal Image Enhancement System," U.S. Pat. No. 4,080,628 or German Pat. No. 2,753,406 of Sony Corporation. Further, the present invention may be used in conjunction with a peaking circuit.

Those who are skilled in the art will appreciate that various alterations or modifications can be made within the scope of the invention. For example, compression of the image enhancement signal can be achieved with a square rooting, cube rooting or other type of circuit, and need not be limited to logarithmic compression. Further, as mentioned above, full-wave rectification of the first derivative of the luminance signal may be obviated in certain arrangements where the polarity of the image enhancement signal is properly maintained through the noise processor. Also, other types or arrangements of image enhancement signal generators may be substituted for the specific one illustratively shown herein. Other types or arrangements of a noise processor may be substituted. With these various substitutions, alterations and modifications, the filter 61 may be modified or in some instances omitted depending on the characteristics of the net system. Also explained above, other types of coupling the image enhancement signal to the CRT may be employed. All of these modifications, and others, are within the scope of the invention which is defined by the appended claims.

What is claimed is:

1. A system for enhancing the edges of video images displayed on a cathode ray tube having an electron gun for generating at least one electron beam which is caused to scan a screen at a nominal scanning speed in line-by-line fashion, comprising:
   image enhancement signal generator means for receiving video signals and for generating image enhancement signals therefrom for video transitions in said video signals;
   image enhancement signal compression means receiving said image enhancement signals for tending to equalize the amplitude thereof, and outputting compressed image enhancement signals;
   noise processing means receiving said compressed image enhancement signals for attenuating image enhancement signals corresponding to near zero level video transitions; and
   means for coupling the output of said noise processor to said cathode ray tube and modulating said scanning speed in accordance therewith.

2. The system of claim 1 wherein said signal compression means comprises a non-linear amplifier.

3. The system of claim 2 wherein said non-linear amplifier comprises a logarithmic amplifier.

4. The system according to claim 1 wherein said image enhancement signal generator means generates a first derivative type image enhancement signal.

5. The system of claim 1 wherein said noise processing means tests the correlation of said compressed image enhancement signals with signals corresponding to the first derivative of said video signals and rejects compressed image enhancement signals not in correlation with said first derivative corresponding signals.

6. The system according to claim 5 wherein said noise processing means includes a limiter receiving a signal corresponding to the first derivative of said video signal and a multiplier receiving said compressed image enhancement signal and the output of said limiter.

7. The system according to claim 1 wherein said noise processing means comprises a gated noise coring system which strips relatively low level signals without substantially affecting relatively large level signals.

8. The system of claim 1 wherein said coupling means includes a deflection yoke receiving signals outputted by said noise processor, said yoke being oriented with respect to said cathode ray tube for magnetic deflection of said electron beam.

9. The system of claim 8 wherein said yoke comprises a pair of series connected coils oriented about the neck of said cathode ray tube, said coils being arranged to include a pair of opposing coil windows.

10. The system according to claim 1 further comprising beam current modulator means for reducing the beam current of said cathode ray tube when said beam scanning speed decreases and for increasing said beam current when said beam scanning speed increases.

11. A system according to claim 1 further comprising a peaking circuit coupled to said video signals and to said cathode ray tube for crispening video level transitions.

12. A spot arrest system comprising:
   means for generating rectified first derivative type image enhancement signals from video signals applied thereto;
   means coupled to said generating means for tending to equalize the amplitude of said image enhancement signals for different non-zero transition levels;
   a gated noise coring circuit coupled to receive compressed image enhancement signals from said equalizing means; and
   means for coupling an output signal from said coring circuit to a cathode ray tube and for modulating its scan speed in accordance with said output signal.

13. The spot arrest system according to claim 12 further comprising a beam current modulator coupled to the output of said coring circuit for varying the beam current of said cathode ray tube with respect to the output of said coring circuit.

14. A method of enhancing the sharpness of transitions in video images displayed in accordance with video signals on a cathode ray tube having an electron gun for generating at least one electron beam which is caused to scan a screen at a nominal scanning speed in line-by-line fashion comprising:
   generating image enhancement signals from said video signals based on video transitions therein;
   compressing said image enhancement signals to tend to equalize the amplitudes thereof;
   attenuating image enhancement signals corresponding to near-zero video transitions; and
   modulating said scanning speed in accordance with said attenuated compressed image enhancement signals.

15. The method of claim 14 wherein said compressing step comprises passing said image enhancement signals through a non-linear amplifier to narrow the dynamic range thereof.

16. The method of claim 15 wherein said signal compressing step comprises passing said image enhancement signals through a logarithmic amplifier.

17. The method of claim 14 wherein said compressing step includes tending to equalize said image enhancement signal amplitudes to an amplitude corresponding to an image enhancement signal for a preselected video signal transition.

18. The method according to claim 14 wherein said generating image enhancement signals step comprises generating a first derivative type image enhancement signal.

19. The method of claim 14 wherein said attenuating step comprises correlating compressed image enhancement signals with first derivative signals of said video signals for determining whether a transition exists, and if no transition exists, substantially attenuating said image enhancement signal.

20. The method according to claim 19 wherein said attenuating step includes applying signals corresponding to first derivatives of said video signals to a limiter for attenuating relatively low level signals and for passing substantially unattenuated relatively moderate and relatively high signals, and multiplying the output of said limiter with said compressed image enhancement signals.

21. The method according to claim 15 wherein said noise processing step comprises coring said compressed image enhancement signal to remove relatively low level signals without substantially affecting relatively large level signals.

22. A method according to claim 15 further comprising modulating the beam current of said cathode ray tube in accordance with changes in the beam scanning speed of said cathode ray tube.

23. The method of claim 15 further including peaking said video signals.

24. A system for enhancing the edges of video images displayed on a cathode ray tube having an electron gun for generating at least one electron beam which is caused to scan a screen at a nominal scanning speed in line-by-line fashion, comprising:

an image enhancement signal generator for receiving video signals and for generating image enhancement signals therefrom for video transitions in said video signals, said generator comprising a first differentiator receiving said video signals, a rectifier coupled to receive the output of said differentiator, a summer whose inputs are coupled to receive the output of said rectifier and said video signal, and a second differentiator coupled to receive the output of said summer, said differentiator outputting said image enhancement signals;

a logarithmic amplifier coupled to receive said image enhancement signals from said differentiator;

noise processor means, coupled to receive the output of said logarithmic amplifier and the output of said rectifier, for testing the correlation of signals outputted by said logarithmic amplifier with signals from said rectifier and rejecting signals outputted by said logarithmic amplifier which are not in correlation with said rectifier output signals; and a deflection yoke oriented about said cathode ray tube and coupled to receive the output of said noise processor means, said yoke modulating said scanning speed of said cathode ray tube in accordance with said noise processor output.

25. The system of claim 24 further comprising a beam current modulator coupled to the output of said noise processor means and controllably coupled to an input to said cathode ray tube to modulate beam current in accordance with said noise processor means output.

* * * * *